(12) United States Patent
Rider et al.

(10) Patent No.: US 11,067,757 B2
(45) Date of Patent: Jul. 20, 2021

(54) OPTICAL WIRE TRANSITION ADAPTER

(71) Applicant: Tyonek Manufacturing Group, Inc., Madison, AL (US)

(72) Inventors: Ted Rider, Saint Joseph, TN (US); Michael Moses, Huntsville, AL (US)

(73) Assignee: Tyonek Manufacturing Group, LLC, Madison, AL (US)

(*) Notice: Subject to any disclaimer, the term of this patent is extended or adjusted under 35 U.S.C. 154(b) by 0 days.

(21) Appl. No.: 16/292,029

(22) Filed: Mar. 4, 2019

(65) Prior Publication Data

US 2020/0284990 A1   Sep. 10, 2020

(51) Int. Cl.
*G02B 6/38* (2006.01)
*G02B 6/44* (2006.01)

(52) U.S. Cl.
CPC .............. *G02B 6/38* (2013.01); *G02B 6/4471* (2013.01); *G02B 6/4459* (2013.01); *G02B 6/4473* (2013.01); *G02B 6/4475* (2013.01); *G02B 6/4495* (2013.01)

(58) Field of Classification Search
CPC .. G02B 6/4459; G02B 6/4473; G02B 6/4476; G02B 6/38; G02B 6/4471; G02B 6/4495; G02B 6/4475; G02B 6/4472
See application file for complete search history.

(56) References Cited

U.S. PATENT DOCUMENTS

| | | | | |
|---|---|---|---|---|
| 3,711,633 A | * | 1/1973 | Ghirardi | H02G 15/18 174/135 |
| 4,625,073 A | * | 11/1986 | Breesch | B29C 61/0608 156/49 |
| 5,115,105 A | * | 5/1992 | Gallusser | H01R 9/0506 174/36 |
| 5,125,060 A | * | 6/1992 | Edmundson | G02B 6/2804 385/100 |
| 5,266,740 A | * | 11/1993 | Hsu | H01R 13/516 174/135 |
| 6,288,337 B1 | * | 9/2001 | Sato | H01B 7/0045 174/113 R |
| 6,603,074 B2 | * | 8/2003 | Seo | B60R 16/0215 174/102 D |

(Continued)

FOREIGN PATENT DOCUMENTS

DE   202013010013 U1 * 2/2015 ............. H02G 3/083

*Primary Examiner* — Ryan A Lepisto
*Assistant Examiner* — Erin D Chiem
(74) *Attorney, Agent, or Firm* — Dennen IP Law, LLC

(57) ABSTRACT

A transition adapter for routing a first optical cable into a plurality of optical cables of the present disclosure has a main body. In addition, the transition adapter has a first channel within the main body and configured for receiving the first optical cable, a second channel, the first channel open to the second channel, the second channel within the main body and configured for receiving a second optical cable, which is a first portion of the first optical cable, the second channel terminating with a first opening from which the second optical cable extends, and a third channel, the first channel open to the third channel, the third channel within the main body and configured for receiving a third optical cable, which is a second portion of the first optical cable, the third channel terminating with a second opening from which the third optical cable extends.

16 Claims, 4 Drawing Sheets

(56) References Cited

U.S. PATENT DOCUMENTS

| | | | | |
|---|---|---|---|---|
| 6,619,697 | B2 * | 9/2003 | Griffioen | F16L 41/023 |
| | | | | 285/126.1 |
| 6,960,722 | B2 * | 11/2005 | Frederick | B60R 16/0215 |
| | | | | 174/72 R |
| 2011/0002588 | A1 * | 1/2011 | Osato | G02B 6/4432 |
| | | | | 385/113 |
| 2015/0098684 | A1 * | 4/2015 | Mulfinger | G02B 6/4471 |
| | | | | 385/135 |

* cited by examiner

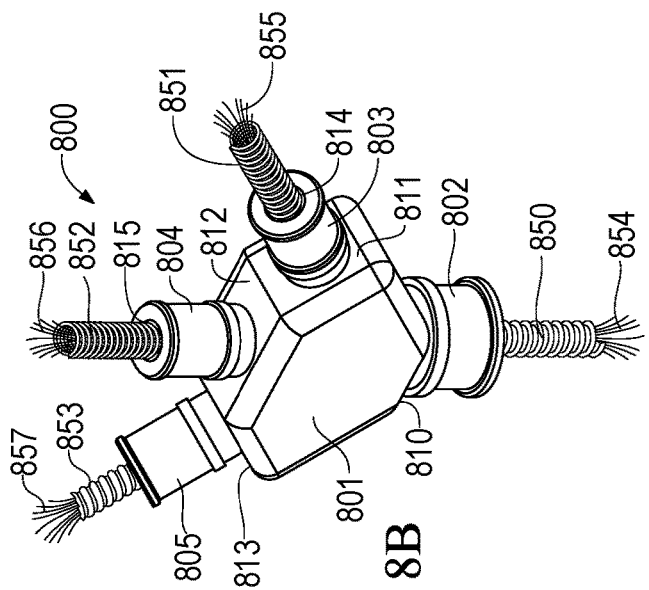
FIG. 8B
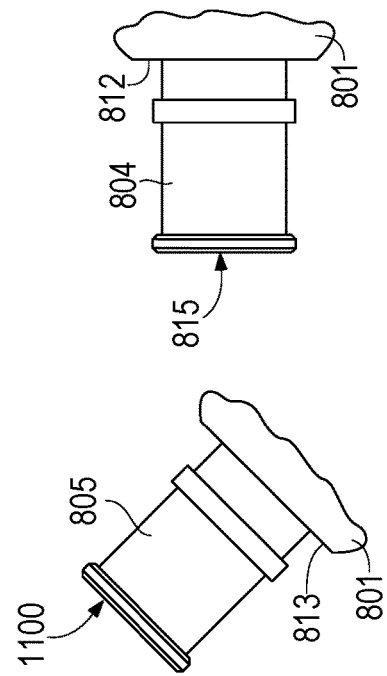
FIG. 12
FIG. 11
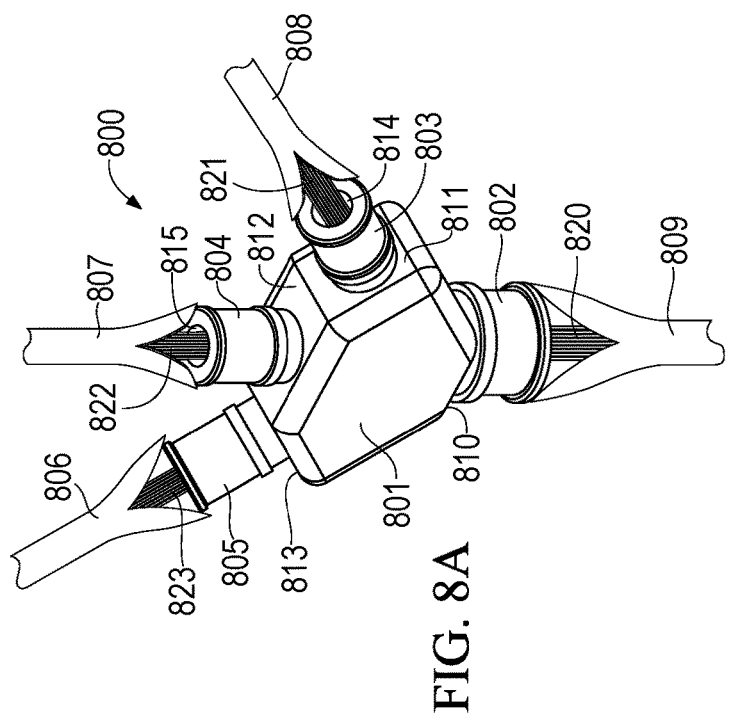
FIG. 8A
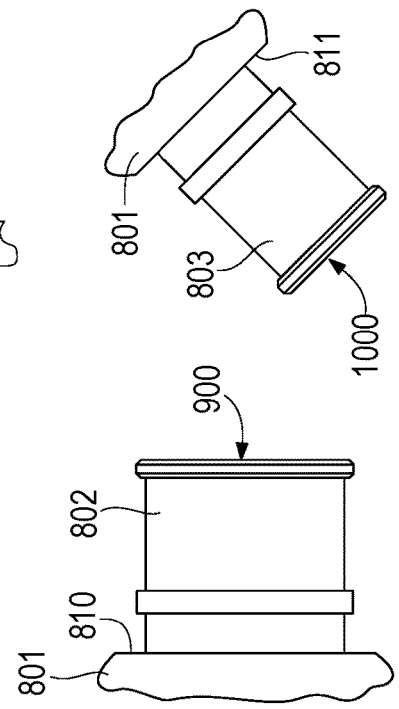
FIG. 10
FIG. 9

OPTICAL WIRE TRANSITION ADAPTER

BACKGROUND

A fiber optic cable is an assembly of a plurality of optical fibers. A fiber optic cable is similar to an electrical cable, but containing the plurality of optical fibers that are used to carry light as opposed to electricity. Each of the optical fibers are typically individually coated with plastic layers and contained in a protective tube suitable for the environment where the cable will be deployed. This is often referred to as a sheath.

Fiber optic cables are often laid throughout large structures. For example, fiber optic cable may be laid throughout buildings or airplanes to implement a communication system. Different types of cable are used for different applications, for example long distance telecommunication, or providing a high-speed data connection between different parts of the building.

Oftentimes, when laying cables portions of the cable need to be routed in two different directions. In such a scenario, the cable is split into to two portions consisting of bundles of fibers, and each portion is routed in the appropriate direction.

SUMMARY

A transition adapter for routing a first optical cable into a plurality of optical cables of the present disclosure has a main body. In addition, the transition adapter has a first channel within the main body and configured for receiving the first optical cable, a second channel, the first channel open to the second channel, the second channel within the main body and configured for receiving a second optical cable, which is a first portion of the first optical cable, the second channel terminating with a first opening from which the second optical cable extends, and a third channel, the first channel open to the third channel, the third channel within the main body and configured for receiving a third optical cable, which is a second portion of the first optical cable, the third channel terminating with a second opening from which the third optical cable extends.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 8A is another exemplary transition adapter in accordance with an embodiment of the present disclosure showing partially removed sheaths on the cables extending from the transition adapter.

FIG. 8B is another exemplary transition adapter in accordance with an embodiment of the present disclosure showing conduits housing cables extending from the transition adapter.

FIG. 9 is a side view of an entry leg of the transition adapter of FIG. 8.

FIG. 10 is a side view of an exit leg of the transition adapter of FIG. 8.

FIG. 11 is a side view of another exit leg of the transition adapter of FIG. 8.

FIG. 12 is a side view of another exit leg of the transition adapter of FIG. 8.

DETAILED DESCRIPTION

The present disclosure describes an optical cable transition adapter. Note that the following discussion describes the transition adapter's use with optical cables; however, the transition adapter may be used with electrical cables as well. In one embodiment, the transition adapter is made of Polytetrafluoroethylene (PTFE), which is also referred to as a brand name, Teflon®.

The transition adapter comprises a main body. In one embodiment the main body is hexagonal; however, it may be other shapes in other embodiments. The transition adapter has an entrance leg through which a bundle of optical fibers is inserted. Within the main body, the bundle optical fibers are split into separate bundles. In one embodiment, the bundle of optical fibers may be split into two separate bundles. However, other numbers of bundles are possible in other embodiments. The transition adapter further has two or more exit legs. Thus, in the present scenario, one of the separate bundles exits the main body through one exit leg, and one of the separate bundles exits the main body through another exit leg. Thus, the transition adapter serves as a union that allows a fiber optic cable to be split so that the fiber optic cables can be run in different directions.

Figure 1:
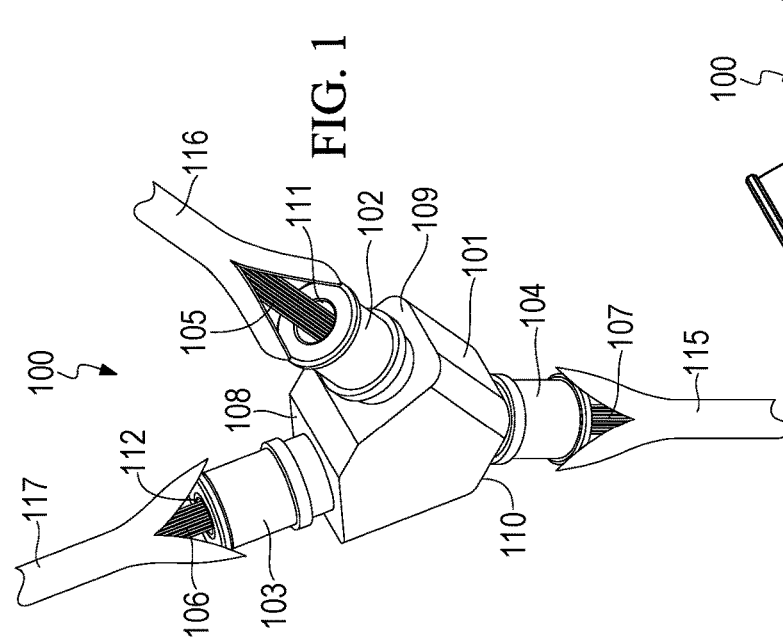
FIG. 1 is a perspective view of an exemplary transition adapter in accordance with an embodiment of the present disclosure showing fiber optic cable with sheathing.

FIG. 1 is a perspective view of a transition adapter 100 in accordance with an embodiment of the present disclosure. The transition adapter 100 comprises a main body 101. In the embodiment shown, the main body 101 is hexagonal, but it can be other shapes in other embodiments. Coupled to or integral with a face 110 of the main body 101 is an entrance leg 104. In one embodiment, an optical cable 107 having a sheath 115, also referred to as a jacket, enters an opening (not shown) in the entrance leg 104.

Note that the sheath 115 is partially removed or pulled back from the optical cable 107 to allow the optical cable 107 to be inserted in the opening (not shown). Further note in one embodiment, the sheath 115 extends over the entrance leg 104. In such an embodiment, a heat sensitive boot (not shown) may be installed on the entrance leg 104 and over the portion of the sheath 115 that extends over the entrance leg 104. When heat is applied, the boot shrinks thereby securing the portion of the sheath 115 that extends over the entrance leg 104 to the transition adapter 100.

Coupled to or integral with a face 109 of the main body 101 is an exit leg 102. In one embodiment, the optical cable 105 having a sheath 116 exits an opening 111 in the exit leg 105.

Note that the sheath 116 is partially removed or pulled back from the optical cable 105 to allow the optical cable 105 to exit the opening 111. Further note in one embodiment, the sheath 116 extends over the exit leg 102. In such an embodiment, a heat sensitive boot (not shown) may be installed on the exit leg 102 and over the portion of the sheath 116 that extends over the exit leg 102. When heat is applied, the boot shrinks thereby securing the portion of the sheath 117 that extends over the exit leg 102 to the transition adapter 100.

Further coupled to or integral with a face 108 of the main body 101 is another exit leg 103. In one embodiment, a portion of the optical cable 106 having a sheath 117 exits an opening 112 in the exit leg 103.

Note that the sheath 117 is partially removed or pulled back from the optical cable 106 to allow the optical cable 106 to exit the opening 112. Further note in one embodiment, the sheath 117 extends over the exit leg 103. In such an embodiment, a heat sensitive boot (not shown) may be installed on the exit leg 103 and over the portion of the sheath 117 that extends over the exit leg 103. When heat is applied, the boot shrinks thereby securing the portion of the sheath 117 that extends over the exit leg 103 to the transition adapter 100.

Upon installation of the optical cable 107, the entering optical cable 107 is separated into optical cable 105 and optical cable 106. Therefore, these separate optical cables 105 and 106 may be run in different directions due to the transition adapter 100 separating the original optical cable 107.

Figure 2:
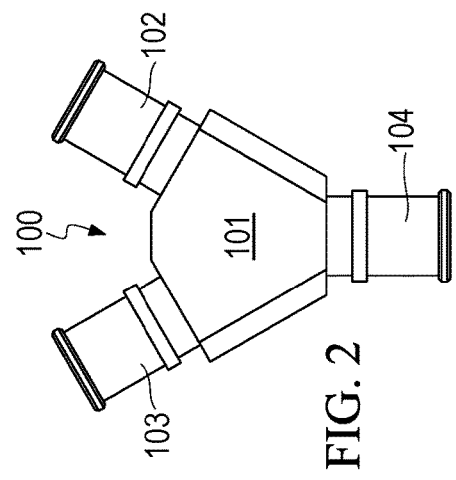
FIG. 2 is a front view of the exemplary transition adapter of FIG. 1.

FIG. 2 is a side view of the transition adapter 100. As described, the transition adapter comprises a main body 101. Further, coupled to or integral with the main body 101 is an entrance leg 104 and two exit legs 102 and 103. Note that while two exit legs 102 and 103 are shown in FIG. 2, more exit legs may be used in other embodiments. Further note that the entrance leg 104 and the two exit legs 102 and 103 are substantially cylindrical. However, the entrance leg 104 and the two exit legs 102 and 103 may be other shapes in other embodiments.

Figure 3A:
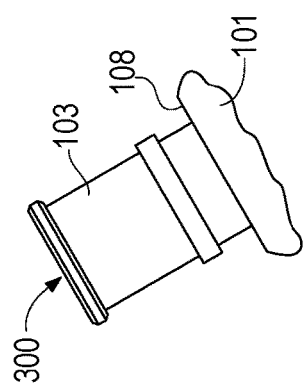
FIG. 3A is a side view of an exit leg of the transition adapter of FIG. 1.

FIG. 3A is a side view of the exit leg 103. As described, coupled to or integral with a face 108 of the main body 101 is the exit leg 103. The optical cable 106 (FIG. 1) exits an opening 112 (FIG. 1) in the exit leg 103. Optical cable 106 is created by splitting the optical cable 107 (FIG. 1) into two separate optical cables.

Figure 3B:
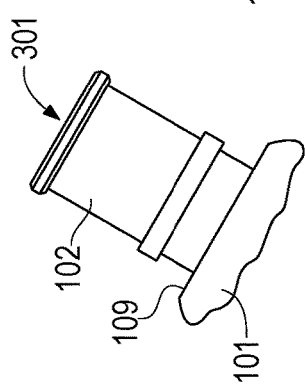
FIG. 3B is a side view of an exit leg of the transition adapter of FIG. 1.

FIG. 3B is a side view of the exit leg 102. As described, coupled to or integral with a face 109 of the main body 101 is the exit leg 102. The optical cable 105 (FIG. 1) exits an opening 111 (FIG. 1) in the exit leg 102. Optical cable 105 is created by splitting the optical cable 107 (FIG. 1) into two separate optical cables.

Figure 3C:
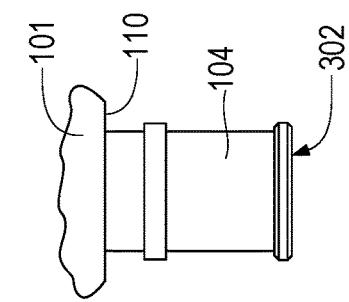
FIG. 3C is a side view of an entry leg of the transition adapter of FIG. 1.

FIG. 3C is a side view of the entrance leg 104. As described, coupled to or integral with a face 110 of the main body 101 is the exit leg 104. The optical cable 107 (FIG. 1) enters the entrance leg 104.

From the transition adapter 100 (FIG. 1), the optical cable 106 can be run in a different direction than the optical cable 105. This is accomplished when the transition adapter 100 splits the incoming cable 107 into the separate optical cables 105 and 106.

Figure 4:
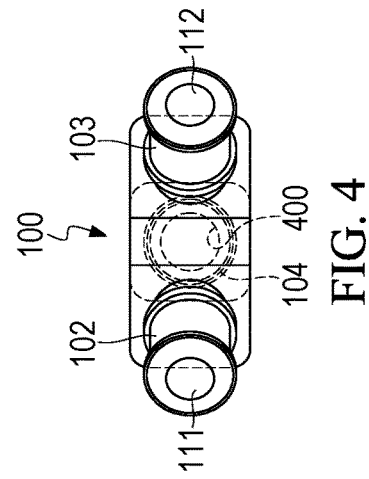
FIG. 4 is a top transparent view of the transition adapter of FIG. 1.

FIG. 4 is a top transparent view of the transition adapter 100. The entrance leg 104 is disposed on a surface of the main body 101 (FIG. 1). The two exit legs 102 and 103 are disposed on an opposing surface of the main body 101.

The entrance leg 104 comprises an opening 400. Within the entrance leg 104 through the opening 400 are a plurality of threads. The threads are for threadedly receiving conduit in which optical fiber is housed, which is described further herein.

Further, the exit leg 102 comprises the opening 111. Within the exit leg 102 through the opening 111 are a plurality of threads. The threads are for threadedly receiving conduit in which optical fiber is housed, which is described further herein.

Additionally, the exit leg 103 comprises the opening 112. Within the exit leg 103 through the opening 112 are a plurality of threads. The threads are for threadedly receiving conduit in which optical fiber is housed, which is described further herein.

Figure 5:
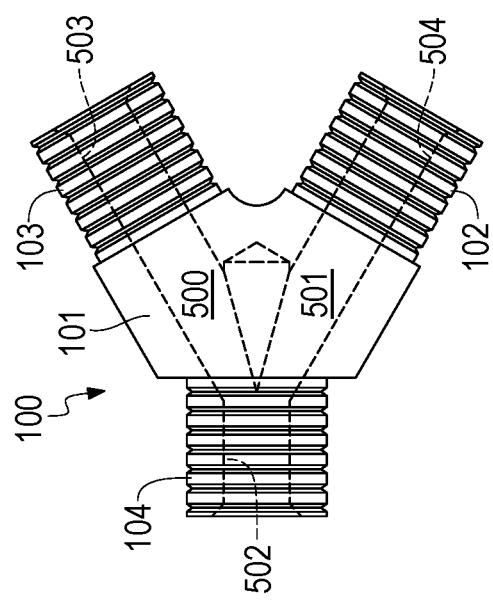
FIG. 5 is a side cross-sectional view of the transition adapter of FIG. 1.

FIG. 5 is a cross-sectional view of the transition adapter 100. The transition adapter 100 comprises the main body 101, the entrance leg 104, and the two exit legs 103 and 102. Note that two exit legs 103 and 102 are shown, but more legs may be used in other embodiments.

FIG. 5 depicts the way whereby the optical cable 107 (FIG. 1) is routed through the main housing 101 and out the exit legs 103 and 102. In this regard, the entrance leg 104 comprises a channel 502 for receiving the optical cable 107. The channel 502 is open to and terminates at the opening of channels 500 and 501 in the main body 101. The optical cable 107 is split into two separate portions and the optical cable 106 (FIG. 1) is routed through channel 500 and the optical cable 105 (FIG. 1) is routed through channel 501.

Exit leg 103 comprises a channel 503, and the channel 500 is open to and terminates at the opening of the channel 503. Thus, the optical cable 106 is routed from channel 500 through channel 503 and out the opening 112 (FIG. 1) of the exit leg 103. Further, exit leg 102 comprises a channel 504, and the channel 501 is open to and terminates at the opening of the channel 504. Thus, the optical cable 105 is routed from channel 501 through channel 504 and out the opening 111 (FIG. 1) of the exit leg 102.

Note that channels 500 and 503 are designated as two separate channels, including a channel in the main body 101 and a channel in the exit leg 103. However, these channels may be connected and represent a single channel that begins at the termination of channel 502 and ends at the opening of the exit leg 103. Further note that channels 501 and 504 are designated as two separate channels, including a channel in the main body 101 and a channel in the exit leg 102. However, these channels may be connected and represent a single channel that begins at the termination of channel 502 and ends at the opening of the exit leg 102.

Figure 6:
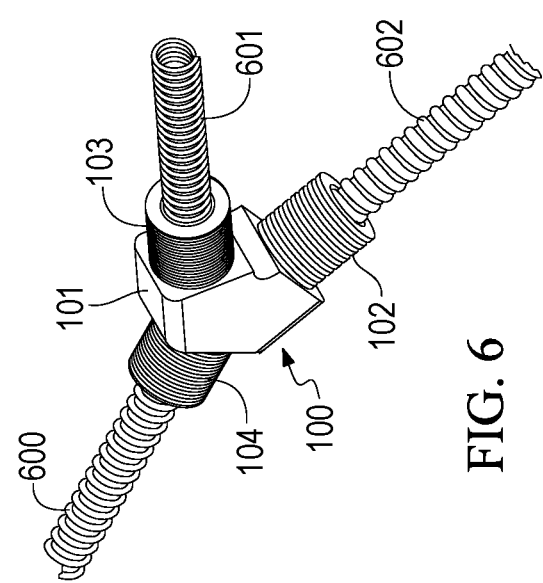
FIG. 6 is a perspective view of the transition adapter of FIG. 1 showing conduit coupled to the exit legs and the entry leg.

FIG. 6 is the transition adapter 100 coupled to conduits as opposed to optical cables with sheaths. The transition adapter 100 has the main body 101, the entrance leg 104, and the exit legs 102 and 103. In addition, coupled to the transition adapter 100 are three conduits 600-602. The conduits 600-602 house the optical cables (not shown) that are routed from the entrance leg 104 to the exit legs 102 and 103.

The conduit 600 is coupled to the entrance leg 104. The conduit 600 may be threadedly coupled via threads on the inside of the entrance leg 104, as described hereinabove.

Conduit 601 is coupled to the exit leg 103. The conduit 601 may be threadedly coupled via threads on the inside of the exit leg 103, as described hereinabove.

Conduit 602 is coupled to the exit leg 102. The conduit 602 may be threadedly coupled via threads on the inside of the exit leg 102, as described hereinabove.

Figure 7:
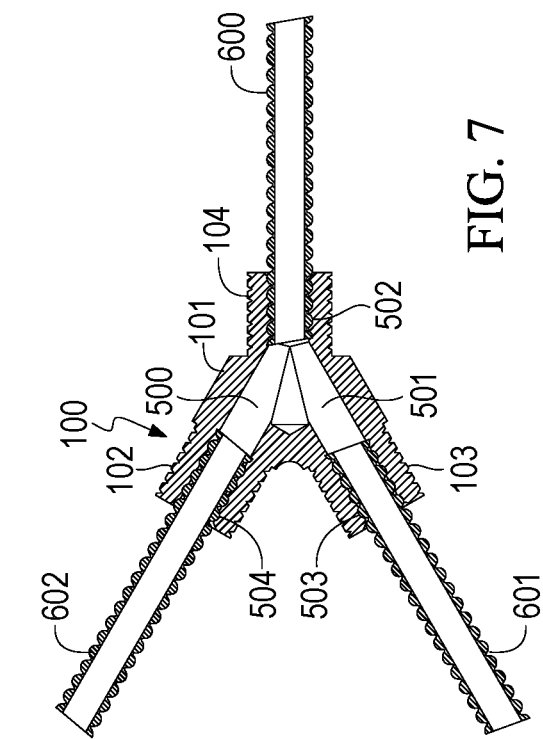
FIG. 7 is a cross-sectional view of the transition adapter of FIG. 6 showing conduit coupled to the exit legs and the entry leg.

FIG. 7 is a cross-sectional view of the transition adapter 100 coupled to the conduits 600-602. FIG. 7 depicts the way whereby the optical cable 107 (FIG. 1) contained in conduit 600 is routed through the main housing 101 and out the exit legs 103 and 102 through conduits 602 and 601.

In this regard, the entrance leg 104 comprises the channel 502, and the conduit 600 is threadedly coupled to the channel 502. The conduit 600 houses the optical cable 107 (FIG. 1). The main body 101 comprises the channels 500 and 501. The optical cable 107 is split into the optical cable 106 (FIG. 1) that is routed through channel 500 and the optical cable 105 (FIG. 1) that is routed through channel 501.

The exit leg 102 comprises the channel 504, and the conduit 602 is threadedly coupled to the channel 504. The conduit 602 houses the optical cable 106 (FIG. 1). The optical cable 106 is routed from channel 500 through the conduit 602 coupled to the exit leg 102.

The exit leg 103 comprises the channel 503, and the conduit 601 is threadedly coupled to the channel 503. The conduit 601 houses the optical cable 105 (FIG. 1). The optical cable 105 is routed from channel 501 through the conduit 601 coupled to the exit leg 103.

FIG. 8A is a perspective view of a transition adapter 800 in accordance with an embodiment of the present disclosure. The transition adapter 800 comprises a main body 801. In the embodiment shown, the main body 801 is hexagonal, but it can be other shapes in other embodiments. Coupled to or integral with a face 810 of the main body 801 is an entrance leg 802. The optical cable 820 having a sheath 809 enters an opening (not shown) in the entrance leg 802.

Note that the sheath 809 is partially removed or pulled back from the optical cable 820 to allow the optical cable 820 to enter the opening of the entrance leg 802. Further note in one embodiment, the sheath 809 extends over the entrance leg 802. In such an embodiment, a heat sensitive boot (not shown) may be installed on the entrance leg 802 and over the portion of the sheath 809 that extends over the entrance leg 802. When heat is applied, the boot shrinks thereby securing the portion of the sheath 809 that extends over the entrance leg 802 to the transition adapter 100.

Coupled to or integral with a face 811 of the main body 801 is an exit leg 803. The optical cable 821 having a sheath 808 exits the transition adapter 800 via an opening 814 in the exit leg 803.

Note that the sheath 808 is partially removed or pulled back from the optical cable 821 to allow the optical cable 821 to exit the opening 814. Further note in one embodiment, the sheath 808 extends over the exit leg 803. In such an embodiment, a heat sensitive boot (not shown) may be installed on the exit leg 803 and over the portion of the sheath 808 that extends over the exit leg 803. When heat is applied, the boot shrinks thereby securing the portion of the sheath 808 that extends over the exit leg 803 to the transition adapter 800.

Coupled to or integral with a face 812 of the main body 801 is an exit leg 804. The optical cable 822 having a sheath 807 exits the transition adapter 800 via an opening 815 in the exit leg 804.

Note that the sheath 807 is partially removed or pulled back from the optical cable 822 to allow the optical cable 822 to exit the opening 815. Further note in one embodiment, the sheath 807 extends over the exit leg 804. In such an embodiment, a heat sensitive boot (not shown) may be installed on the exit leg 804 and over the portion of the sheath 807 that extends over the exit leg 804. When heat is applied, the boot shrinks thereby securing the portion of the sheath 807 that extends over the exit leg 804 to the transition adapter 800.

Coupled to or integral with a face 813 of the main body 801 is an exit leg 805. The optical cable 823 having a sheath 806 exits the transition adapter 800 via an opening (not shown) in the exit leg 805.

Note that the sheath 806 is partially removed or pulled back from the optical cable 823 to allow the optical cable 823 to exit the opening in the exit leg 805. Further note in one embodiment, the sheath 806 extends over the exit leg 805. In such an embodiment, a heat sensitive boot (not shown) may be installed on the exit leg 805 and over the portion of the sheath 806 that extends over the exit leg 805. When heat is applied, the boot shrinks thereby securing the portion of the sheath 806 that extends over the exit leg 805 to the transition adapter 800.

The original optical cable 820 entering transition adapter 800 is separated into three optical cables 821, 822, and 823. Therefore, these separate optical cables 821, 822, 823 may be run in different directions due to the transition adapter 800 separating the original optical cable 820.

FIG. 8B illustrates the transition adapter 800 like that shown in FIG. 8A. However, optical cables 854-857 entering and exiting the transition adapter 800 are housed in conduits 850-853.

Similar to FIG. 8A, the transition adapter 800 comprises a main body 801. Coupled to or integral with the face 810 of the main body 801 is the entrance leg 802. The optical cable 854 is housed in a conduit 850. The conduit 850 couples to an opening (not shown) in the entrance leg 802. In this regard, the inside channel (not shown) of the entrance leg 802 may be threaded, and the conduit 850 may have corresponding threads, so that the conduit 850 threadedly couples to the entrance leg 802.

Coupled to or integral with the face 811 of the main body 801 is the exit leg 803. The optical cable 855 is housed in a conduit 851. The conduit 851 couples to an opening 814 in the exit leg 803. In this regard, the inside channel (not shown) of the exit leg 803 may be threaded, and the conduit 851 may have corresponding threads, so that the conduit 851 threadedly couples to the exit leg 803.

Coupled to or integral with the face 812 of the main body 801 is the exit leg 804. The optical cable 856 is housed in a conduit 852. The conduit 852 couples to an opening 815 in the exit leg 804. In this regard, the inside channel (not shown) of the exit leg 804 may be threaded, and the conduit 852 may have corresponding threads, so that the conduit 852 threadedly couples to the exit leg 804.

Coupled to or integral with the face 813 of the main body 801 is the exit leg 805. The optical cable 857 is housed in a conduit 853. The conduit 853 couples to an opening (not shown) in the exit leg 805. In this regard, the inside channel (not shown) of the exit leg 805 may be threaded, and the conduit 853 may have corresponding threads, so that the conduit 853 threadedly couples to the exit leg 805.

FIG. 9 is a side view of the entrance leg 802. As described, the entrance leg 802 is coupled to or integral with a face 810 of the main body 801. An optical cable 820 (FIG. 8A) or a conduit 850 (FIG. 8B) containing optical cable 854 (FIG. 8) enters an opening 900 in the entrance leg 802.

FIG. 10 is a side view of the exit leg 803. As described, the exit leg 803 is coupled to or integral with a face 811 of the main body 801. An optical cable 821 (FIG. 8A) or a conduit 851 (FIG. 8B) containing optical cable 855 (FIG. 8B) exits opening 814 in the exit leg 803.

FIG. 11 is a side view of the exit leg 805. As described, the exit leg 805 is coupled to or integral with a face 813 of the main body 801. An optical cable 823 (FIG. 8A) or the conduit 853 (FIG. 8B) containing optical cable 858 (FIG. 8B) exits an opening 1100 in the exit leg 805.

FIG. 12 is a side view of the exit leg 804. As described, the exit leg 804 is coupled to or integral with a face 812 of the main body 801. An optical cable 822 (FIG. 8A) or a conduit 852 (FIG. 8B) containing optical cable 856 (FIG. 8B) exits the opening 815 in the exit leg 804.

Figure 13:
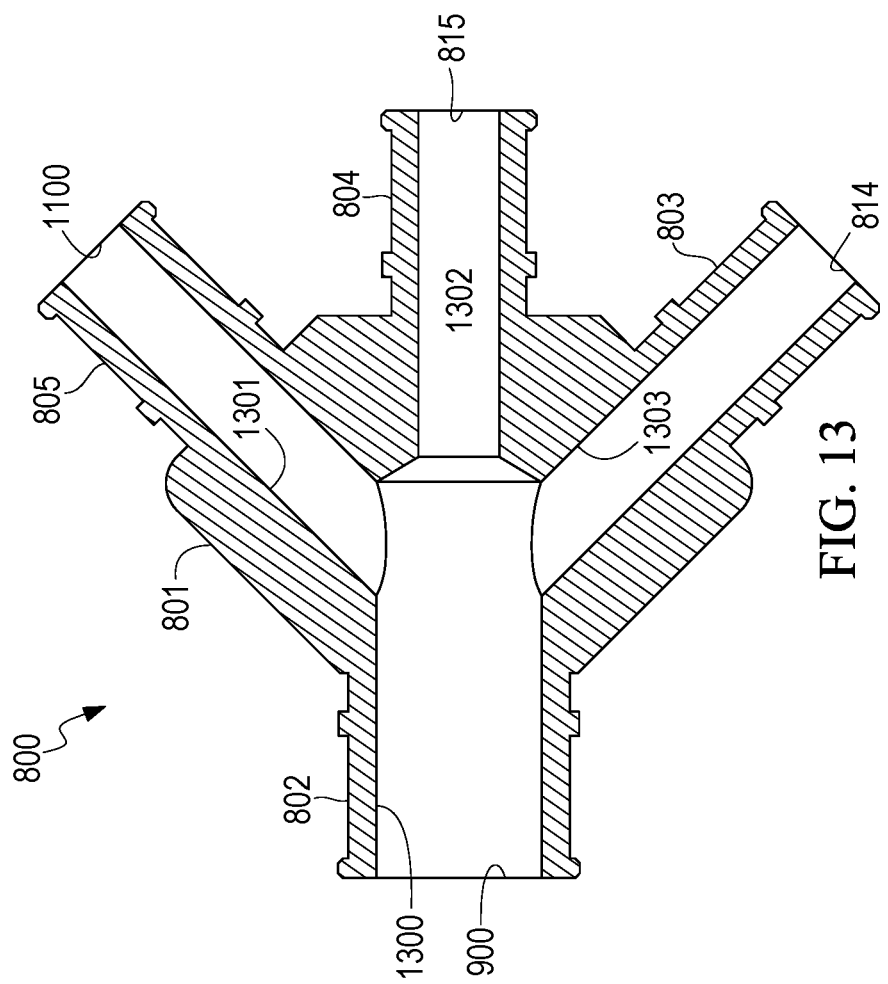
FIG. 13 is a cross-sectional view of the transition adapter of FIG. 8.

FIG. 13 depicts the way whereby the optical cable 820 (FIG. 8A) or optical cable 854 (FIG. 8B) is separated and routed through the main housing 801 and out the exit legs 803-805. In this regard, the entrance leg 802 comprises a channel 1300 for receiving the optical cable 820. Note that in the embodiment wherein conduit is used, the conduit threadedly couples to the channel 1300. The channel 1300 open to and terminates with channels 1301-1303 in the main body 801.

A portion of the optical cable 820 or 854 is routed through each of the channels 1301-1303. Thus, the optical cable 820 or 854 is split into three separate optical cables, which exit the transition adapter 800 via the openings 813, 815, and 1100 in the exit legs 803-805, respectively.

In this regard, a portion of the optical cable 820 or 854 is routed through channel 1301 and exits opening 1100 of the exit leg 805. A portion of the optical cable 820 or 854 is routed through channel 1302 and exits opening 815 of the exit leg 804, and a portion of the optical cable 820 and 854 is routed through channel 1303 and exits opening 814 of exit leg 803.

What we claim is:

1. A transition adapter for routing a first optical cable into a plurality of optical cables, comprising:
    a main body comprising an entrance leg, a first exit leg and a second exit leg;
    a first channel within the main body and configured for receiving a first optical cable through the entrance leg, the first optical cable comprising a first sheath wherein the first sheath is partially removed from the first optical cable to allow the first optical cable to be inserted within the first channel and the first sheath extends over the entrance leg and a first heat sensitive boot is applied to the first sheath;
    a second channel, the first channel open to the second channel, the second channel within the main body and configured for receiving a second optical cable through the first exit leg, which is a first portion of the first optical cable, the second channel terminating with a first opening from which the second optical cable extends and the second optical cable comprising a second sheath and the second sheath is partially removed from the second optical cable to allow the second optical cable to be inserted within the second channel and the second sheath extends over the first exit leg and a second heat sensitive boot is applied to the second sheath; and
    a third channel, the first channel open to the third channel, the third channel within the main body and configured for receiving a third optical cable through the second exit leg, which is a second portion of the first optical cable, the third channel terminating with a second opening from which the third optical cable extends and wherein the third optical cable comprising a third sheath and the third sheath is partially removed from the third optical cable to allow the third optical cable to be inserted within the third channel and the third sheath extends over the second exit leg and a third heat sensitive boot is applied to the third sheath.

2. The transition adapter for routing the first optical cable into the plurality of optical cables of claim 1, the entrance leg housing the first channel.

3. The transition adapter for routing the first optical cable into the plurality of optical cables of claim 1, wherein the entrance leg is cylindrical.

4. The transition adapter for routing the first optical cable into the plurality of optical cables of claim 1, wherein the first exit leg and the second exit leg are coupled to the main body on a side opposing the entrance leg.

5. The transition adapter for routing the first optical cable into the plurality of optical cables of claim 4, wherein the at least two exit legs are cylindrical.

6. The transition adapter for routing the first optical cable into the plurality of optical cables of claim 4, wherein the entrance leg and the first exit leg and the second exit leg each comprise openings.

7. The transition adapter for routing the first optical cable into the plurality of optical cables of claim 6, wherein the first optical cable enters the entrance leg opening in the entrance leg.

8. The transition adapter for routing the first optical cable into the plurality of optical cables of claim 7, wherein the second optical cable exits the opening in the first exit leg.

9. The transition adapter for routing the first optical cable into the plurality of optical cables of claim 8, wherein the third optical cable exits the opening in the second exit leg.

10. The transition adapter for routing the first optical cable into the plurality of optical cables of claim 4, wherein the entrance leg comprises an entrance opening, the first exit leg comprises a first exit leg opening, and the second exit leg comprises a second exit leg opening.

11. The transition adapter for routing the first optical cable into the plurality of optical cables of claim 10, further comprising a first conduit, the first conduit housing the first optical cable.

12. The transition adapter for routing the first optical cable into the plurality of optical cables of claim 11, wherein the first conduit is threadedly coupled to a channel within the entrance leg.

13. The transition adapter for routing the first optical cable into the plurality of optical cables of claim 12, further comprising a second conduit, the second conduit housing the second optical cable.

14. The transition adapter for routing the first optical cable into the plurality of optical cables of claim 13, wherein the second conduit is threadedly coupled to a channel within the first exit leg.

15. The transition adapter for routing the first optical cable into the plurality of optical cables of claim 13, wherein the third conduit is threadedly coupled to a channel within the second exit leg.

16. The transition adapter for routing the first optical cable into the plurality of optical cables of claim 12, further comprising a third conduit, the third conduit housing the third optical cable.

* * * * *